M. ALAKSIN.
NON-SKID LINK.
APPLICATION FILED MAY 4, 1914.

1,110,524. Patented Sept. 15, 1914.

Witnesses
G. Notes
D. H. Bryant

Inventor
Mihael Alaksin
A. M. Wilson
Attorney

UNITED STATES PATENT OFFICE.

MIHAEL ALAKSIN, OF BEAVER FALLS, PENNSYLVANIA.

NON-SKID LINK.

1,110,524.

Specification of Letters Patent.   Patented Sept. 15, 1914.

Application filed May 4, 1914.   Serial No. 836,174.

*To all whom it may concern:*

Be it known that I, MIHAEL ALAKSIN, a subject of the Emperor of Austria-Hungary, residing at Beaver Falls, in the county of Beaver and State of Pennsylvania, have invented certain new and useful Improvements in Non-Skid Links, of which the following is a specification.

This invention relates to new and useful improvements in non-skid link.

The primary object of this invention is to provide a non-skid element formed from a single resilient strip and thus furnishing a link which is easy and inexpensive to manufacture but which at the same time has great efficiency as a non-skid element.

A further object is to provide a tread member from a longitudinally-slotted resilient strip and which is easily attached to and detached from the tread portion of an automobile tire and adapted to position calk members projecting therefrom.

A still further object is to provide a resilient strip adaptable for encircling an automobile tire and divided at the tread-engaging portion for positioning traction calks while the link is removably locked to the wheel.

With these general objects in view and others that will appear as the nature of the invention is better understood, the same consists in the novel combination and arrangement of parts hereinafter fully described, illustrated in the accompanying drawings, and pointed out in the appended claims.

Figure 1:
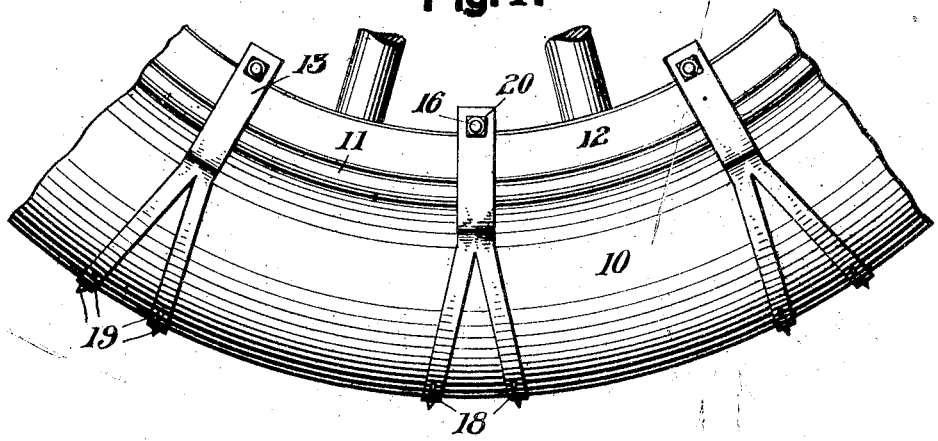
Figure 2:
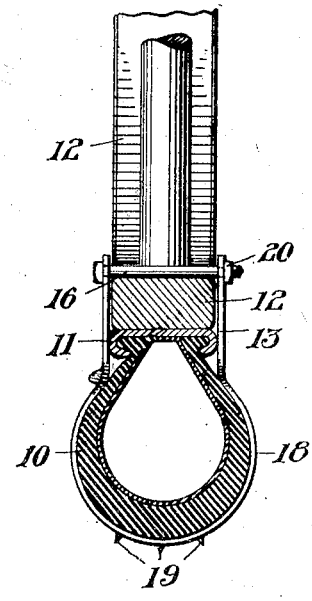
Figure 3:
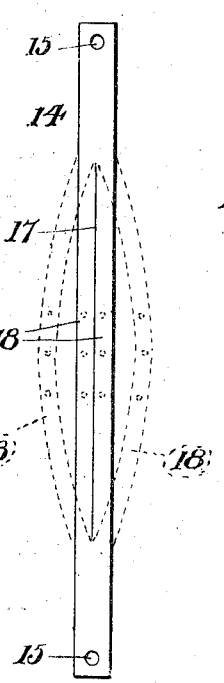

In the drawings forming a part of this application and wherein like designating numerals of reference denote corresponding parts throughout the several views:—Figure 1 is a side elevation of a portion of a wheel with three of the present form of links secured thereto. Fig. 2 is a transverse sectional view taken through the tire portion of the wheel adjacent to one of the links. Fig. 3 is a view of the unbent strip from which the link is formed, illustrating in dotted lines the manner of separating the tread portions, and, Fig. 4 is a perspective view of one of the links removed.

Referring more in detail to the drawings, the tire 10 is illustrated as mounted upon the rim 11 of the wheel felly 12 and having the present form of link 13 mounted thereon.

The present non-skid link is formed from a single strip of resilient metal 14 having terminal perforations 15 adapted for the reception of the locking bolt 16. The strip 14 is longitudinally cut or slitted along the central line 17 which forms separable opposite side strips 18 which are adapted to be bent outwardly as illustrated in dotted lines in Fig. 3. The strip 14 is also adapted to be bent with its opposite ends approaching each other after the manner of an arch for the purpose of spanning a tire with its opposite ends receiving the locking bolt 16 inwardly of the wheel felly 12. The side strips 18 are provided on their outer faces with a plurality of pointed calks 19 which are positioned for engaging the road-bed when the link is operatively placed upon the wheel.

Figure 4:
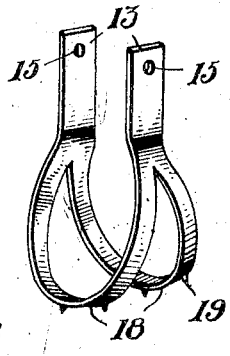

The complete operation of the device will be apparent from the present description in that the link formed as illustrated in Fig. 4 of resilient metal is adapted to be slightly spread and sprung upon the tire with the portion 18 thereof separated, while the locking bolt 16 is secured in the end perforations 15 by means of the lock nut 20 and when so positioned, the link is firmly although removably, locked to the tire and with the calks 19 positioned for use upon the tread portion thereof.

While the forms of the invention herein shown and described are what are believed to be preferable embodiments thereof, it is nevertheless to be understood that various forms and modifications may be resorted to which fall within the spirit and scope of the invention as claimed.

What I claim as new is—

1. A non-skid link comprising a substantially arch-shaped resilient single piece strip having integral oppositely diverging tread strips connected with each other intermediate the ends of said strip, outwardly-projecting sharpened calks upon said tread strips, and said strip provided with bolt-receiving perforations adjacent its opposite free ends.

2. A non-skid link substantially arch-shaped in cross-section and comprising end strip members, diverging tread strips integrally secured to said strip members and adapted for engaging the tread portion of a tire, and locking means engaging said strip members.

In testimony whereof I affix my signature in presence of two witnesses.

MIHAEL ALAKSIN.

Witnesses:
E. H. WARD,
HOMER HALL.